United States Patent
Stockton

[15] 3,693,703
[45] Sept. 26, 1972

[54] SPUR DRIVE FOR REGENERATOR-TYPE HEAT EXCHANGER

[72] Inventor: Thomas Rowe Stockton, Ann Arbor, Mich.

[73] Assignee: Ford Motor Company, Dearborn, Mich.

[22] Filed: Dec. 31, 1970

[21] Appl. No.: 103,215

[52] U.S. Cl.................165/8, 74/446, 64/15 R, 64/27 R, 165/10
[51] Int. Cl..............................F28d 19/04
[58] Field of Search..165/8, 10; 64/15 R, 27 R, 27 L; 74/446, 447

[56] References Cited
UNITED STATES PATENTS 3,401,741  9/1968  Paluszny et al.................165/8
3,430,687  3/1969  Wardale........................165/8
3,586,096  6/1971  McLean........................165/8
3,177,735  4/1965  Chute........................74/446 X

*Primary Examiner*—Albert W. Davis, Jr.
*Attorney*—John R. Faulkner and Keith L. Zerschling

[57] ABSTRACT

A rimless rotary heat exchanger of the disc type having ceramic plugs buried in the peripheral face thereof. These plugs have depressions frictionally containing spring metal clips which have means in the form of a sharp spur that engage and deform the material of a drive ring gear positioned about the peripheral face of the heat exchanger.

7 Claims, 4 Drawing Figures

PATENTED SEP 26 1972

INVENTOR.
Thomas R. Stockton
BY John R. Faulkner
Keith L. Zerschling
ATTORNEYS

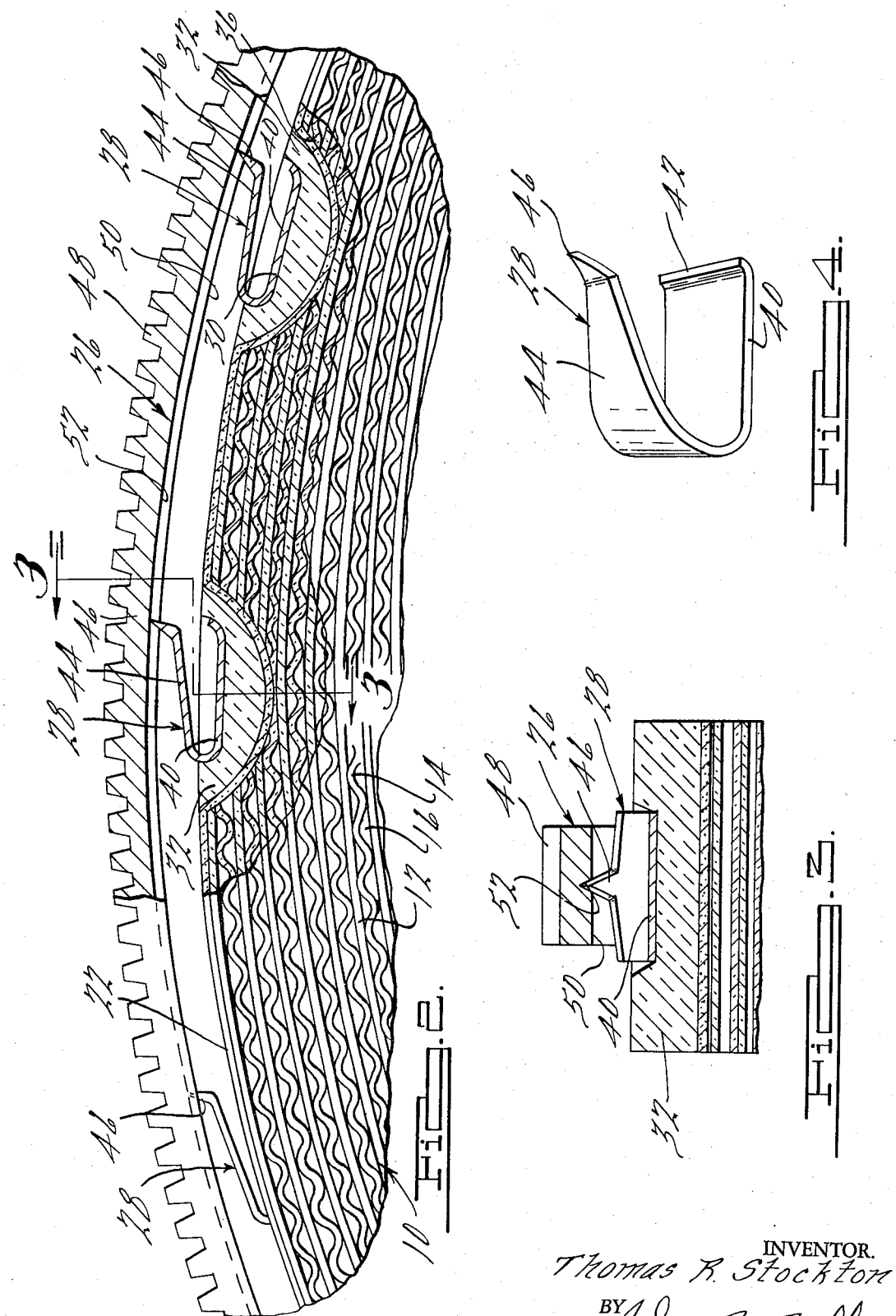

SPUR DRIVE FOR REGENERATOR-TYPE HEAT EXCHANGER

BACKGROUND AND SUMMARY OF THE INVENTION

This invention relates to a rotary heat exchanger of the type that may be used in an automotive gas turbine engine and more particularly to a rimless ceramic rotary regenerator of the disc type which is driven by means of an annular metal ring gear.

In U.S. Pat. No. 3,401,741, there is shown a ceramic rotary heat exchanger drive assembly which comprises a plurality of ceramic-like plug inserts positioned in the peripheral face of a ceramic matrix which comprises the heat exchanger. Each of the ceramic-like plug inserts has a recess which receives a portion of a spring clip. These spring clips have tabs or hooks which are positioned in engagement with a flange extending laterally in both directions from the ring gear.

The present invention provides an improvement over the structure described above and shown in U.S. Pat. No. 3,401,741. In the invention, a plurality of spring clips are positioned in the space between an outer peripheral face of an annular ceramic heat exchange matrix of the axial flow type and the inner surface of a surrounding annular driving means or ring gear which is employed to drive the annular ceramic matrix. These spring clips have means engaging the matrix for preventing relative circumferential movement of each of the spring clips with respect to the matrix in the intended direction of rotation, and the spring clips also include means engaging and deforming the material of the inner surface of the ring gear for preventing relative circumferential movement of the ring gear with respect to the spring clip in the intended direction of rotation of the ring gear.

In the preferred form of the invention, the inner surface of the ring gear adjacent the outer peripheral surface of the ceramic matrix is provided with an annular groove which may be of generally V-shaped cross section, and the spring clip is provided with a sharp apex or spur which fits within this annular groove and indents or deforms the material of the ring gear to provide a driving relationship between the ring gear and the plurality of spring clips. The spring clips are also preferably positioned within recesses in a plurality of circumferentially spaced ceramic plugs located within the outer portion of the annular ceramic matrix.

As a result of the above-described structure, the drive load from the ring gear is evenly distributed to the annular ceramic matrix which comprises the heat exchanger. The annular driving means or ring gear is automatically located axially with respect to the annular ceramic matrix by virtue of the sharp apices of the spring clips fitting within the complementary shaped groove in the ring gear. In addition, no close spacing requirements need be met at final assembly. The provision of the annular groove which receives the sharp apices or spurs on the spring clips provides a structure where this engagement may occur anywhere within the 360° circumference of the annular ring gear. Thus, there is no structure that needs to be provided which has close dimensional tolerances on the ring gear with respect to the ceramic matrix and spring clips. It is also readily apparent that the spring clips of the present invention are reusable and may be used with any type of ring gear assembly. Moreover, the resultant vector forces of the spring load of the spring clips and the driving load components can be arranged to pass through the geometric center of the ceramic plugs so as to eliminate any sheer loading of the cement bond at the interface of the ceramic matrix and these plugs.

An object of the present invention is the provision of an uncomplicated and inexpensive driving connection between an annular driving means and a ceramic rotary heat exchanger.

Another object of the invention is the provision of an inexpensive and uncomplicated drive arrangement between an annular drive gear and a ceramic heat exchange matrix which is easily assembled and has no close dimensional tolerances with respect to any of the components employed.

Other objects and attendant advantages of the present invention may be more readily realized as the specification is considered in connection with the attached drawings.

BRIEF DESCRIPTION OF THE DRAWINGS

FIG. 2 is an enlarged view of a portion of FIG. 1, with parts broken away and in section;

FIG. 3 is a sectional view taken along the lines 3—3 of FIG. 2; and

FIG. 4 is a perspective view of one of the spring clips of the present invention.

DESCRIPTION OF THE PREFERRED EMBODIMENT

Figure 1:
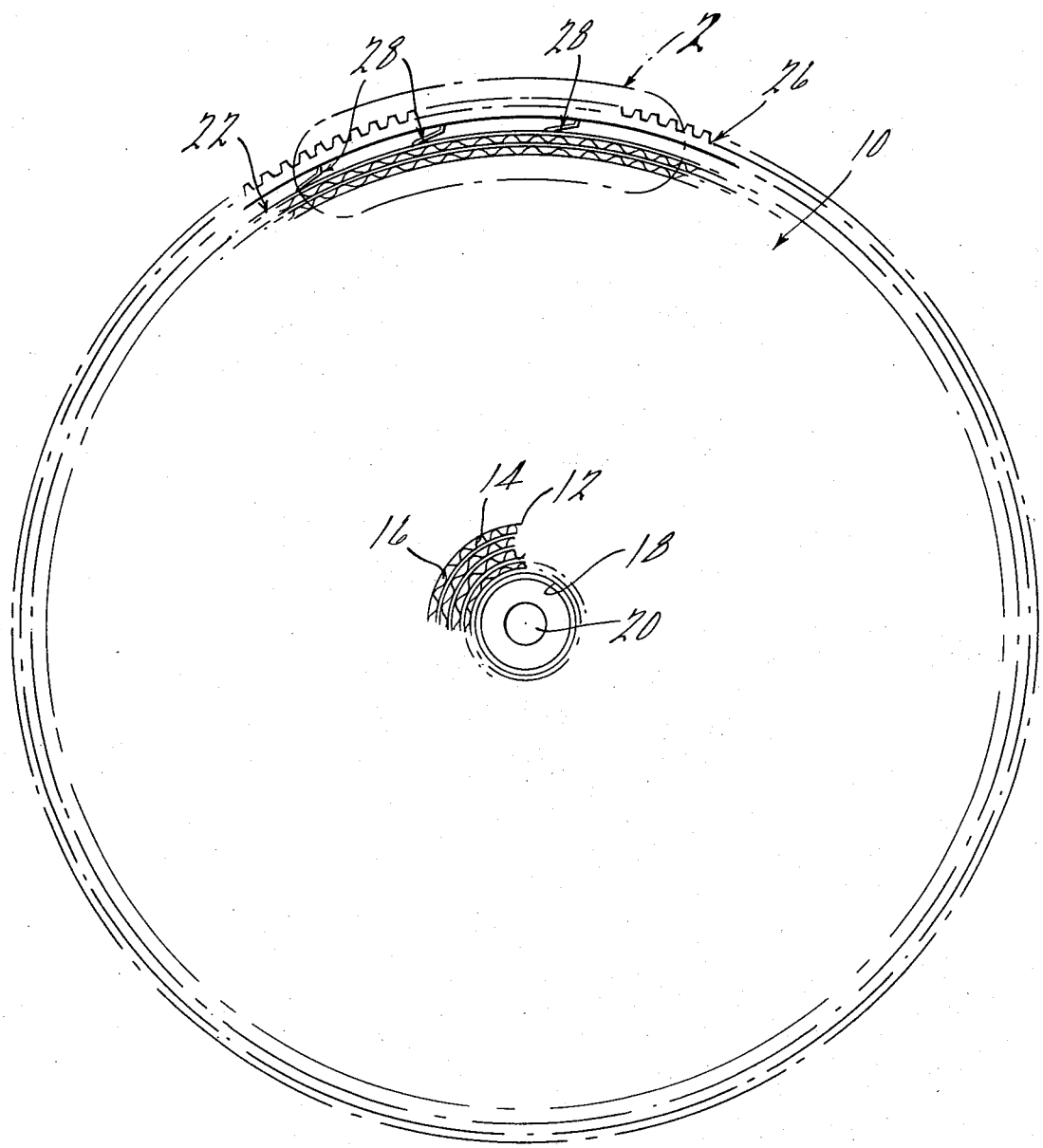
FIG. 1 is a side elevational view of a rotary disc-type heat exchanger embodying the present invention.

Referring now to the drawings in which like reference numerals designate like parts throughout the several views thereof, there is shown in FIG. 1 a disc-like rotary regenerator or heat exchanger of the type commonly used in automotive gas turbine engines. It has a matrix 10 that consists of a plurality of radially alternating flat and corrugated ceramic strips 12 and 14, respectively. These strips are brazed or otherwise secured together to provide radially sealed axial flow fluid or gas passages 16. This matrix has an inner aperture 18 and is center mounted on a stationary shaft 20 by suitable bearing means not shown.

The matrix has a uniform cross section from hub aperture 18 to the outer peripheral surface 22. At this outer peripheral surface, a thin coat of cement is applied around the circumference of the matrix to radially seal the outermost axial flow passages. For clarity, this thin cement coating is shown in exaggerated form.

A conventional narrow metallic ring gear 26 comprises the driving member for rotatably driving the matrix 10. In general, it is secured to the matrix by a number of flexible spring clips 28. These clips are preloaded upon assembly of the ring gear around the matrix to frictionally engage recessed or scalloped portions 30 provided in each of a plurality of ceramic plugs 32 buried within the outer surface of the matrix 10 and preferably positioned about the periphery of the matrix with equal spacing between them.

More specifically, the outer cemented face of the matrix 10 has a plurality of circumferentially spaced small recesses or depressions 36 of shallow extent and preferably semi-circular in cross section. Each of these recesses is filled or plugged with a ceramic material which is then machined to provide the recess or depression 30 conforming to the shape of the inner portion of the flexible metallic spring clips 28.

The spring clips 28 are generally U-shaped in cross section as shown in FIG. 2. Each clip has a body portion 40 which is generally planar and rectangular in shape. The free end of this body portion has an upturned flange 42 which is complementary in shape to one end of the recess or depression 30. The other leg 44 of the generally U-shaped spring clip 28 is preferably taper contoured to equalize bending stress throughout the clip so as to achieve a maximum and constant radial spring load regardless of dimensional tolerance accumulation. This other leg 44 terminates in a sharp spur or apex 46 which is preferably positioned at an obtuse angle with respect to the leg 44.

The annular drive means or ring gear 26 has a plurality of spur teeth 48 positioned on the outer periphery thereof for engagement with a pinion drive gear (not shown). The inner surface 50 of the ring gear or annular drive means 26 is provided with an annular groove 52 which preferably is complementary in shape to the sharp spur or apex 46 of the spring clip 28.

The material which forms the sharp spur or apex 46 is harder than the material which forms the ring gear 26, so that the sharp spur or apex 46 will indent or deform the material of the ring gear 26 during assembly and drive operations.

In assembly of the ring gear 26, the matrix 10, and the spring clips 28, the spring clips may be positioned about the inner periphery or surface 50 of the ring gear 26 with the apices or sharp spurs 46 of the spring clips 28 positioned in the groove 52. The spring clips 28 are then compressed so that they may be properly positioned within the depressions or recesses 30 in the ceramic plugs 32. As can readily be appreciated by an inspection of FIGS. 2, 3 and 4, the spacing between the legs 44 and 40 and more particularly between the upturned flange 42 and the apex or spur 46 of the spring clip 28 when it is in the free or unstressed position as shown in FIG. 4 is much greater than it is when the clip is in the assembled position as shown in FIGS. 2 and 3. Consequently, large radial forces are developed in the spring clip which cause the spur or apex 46 to deform the material of the ring gear 26 or, stated otherwise, the apex or spur 46 indents or digs into the material of the ring gear 26. Additionally, when tangential or circumferential forces are applied to the spur or apex 46 upon rotation of the ring gear in a counter clockwise direction as shown in FIG. 2, these tangential or circumferential forces cause a further deformation or indentation of the material of the ring gear 26.

It can be readily appreciated that the groove 52 positioned in the inner surface 50 of the ring gear or annular drive means 26 may be V-shaped as shown, or it also may be rectangular or of any other desired contour which would properly mate with the shape of the sharp apex or spur 46. Likewise, this apex or spur 56 could be shaped somewhat differently than as shown in the drawings to conform to the other shapes of the annular grooves in the inner surface of the ring gear. It can also be appreciated that multiple grooves and multiple apices may be provided on the inner surface of the ring gear and on the spring clips, respectively.

Although not shown in the drawing, the outer peripheral surface 22 of the matrix 10 could be provided with a peripheral groove having the same width as the planar portion 40 of the spring clips 28. Consequently, if the matrix 10 encounters resistance to rotation, the spring clips 28, can ride out of the recesses depression 30 in the ceramic plugs 32 on the outer peripheral surface 22 from recess to recess in the ceramic plugs 32.

Thus, the present invention provides an extremely uncomplicated and inexpensive drive means for a ceramic type rimless rotary heat exchanger. Additionally, the present invention has the advantage, among others, that close dimensional tolerances need not be maintained between any of the component parts of the heat exchange drive assembly including the ring gear, the spring clips and the rotary heat exchange matrix itself.

I claim:

1. A drive assembly for a rimless rotary regenerator of the disc type comprising a disc-like rotatable annular ceramic matrix of the axial fluid flow type, and rotatable drive means cooperating with a peripheral face of said matrix to rotate said matrix, said face having a plurality of circumferentially spaced recesses positioned therein, a ceramic-like plug means positioned in each of said recesses, a spring clip having a body portion engaging each of said ceramic-like plug means, said rotatable drive means having an annular groove positioned therein in radially spaced relationship with respect to the peripheral face of said matrix, each of said spring clips having a spur tip end portion positioned in said annular groove and indented into the material of said rotatable drive means.

2. The combination of claim 1 in which each of said ceramic-like plug means has a recess positioned therein and said body portion of said spring clip is positioned in said recess.

3. The combination of claim 2 in which each of said spring clips is shaped substantially in a U with the apex end thereon facing in a circumferential direction opposite to the direction of rotation of said rotatable drive means.

4. The combination of claim 3 in which said spur tip end portion of said spring clip extends from one end of the U and is indented into the material of said rotatable drive means at an obtuse angle with respect thereto when viewed in the direction of intended rotation of said drive means.

5. The combination of claim 4 in which said spring clip is tapered from said spur tip end portion to said body portion.

6. A drive assembly for a rimless rotary regenerator of the disc type comprising a disc-like rotatable annular ceramic matrix of the axial flow type, a ring gear positioned around said disc-like rotatable annular ceramic matrix, said ring gear having an inner surface positioned in radial spaced relationship to the outer peripheral face of said matrix, the outer surface of said ring gear having a plurality of gear teeth positioned therein, a plurality of spring clips positioned in the space between the outer peripheral face of said matrix and the inner surface of said ring gear, each of said spring clips having means engaging said matrix for preventing relative circumferential movement of said spring clip with respect to said matrix in the intended direction of rotation of said matrix and means engaging and deforming the material of the inner surface of said ring gear for preventing relative circumferential movement of said ring gear with respect to said spring clip in the intended direction of rotation of said ring gear.

7. The combination of claim 6 in which said last mentioned means comprises a sharp spur formed on said spring clip extending in a direction opposite to the intended direction of rotation of said ring gear.

* * * * *